United States Patent [19]

Schimmelman

[11] 4,070,745

[45] Jan. 31, 1978

[54] CRIMPING TOOL

[75] Inventor: Arthur H. Schimmelman, Agura, Calif.

[73] Assignee: Precision Dynamics Corporation, Burbank, Calif.

[21] Appl. No.: 707,308

[22] Filed: July 21, 1976

[51] Int. Cl.$^2$ .............................................. B23P 19/04

[52] U.S. Cl. .................................... 29/268; 81/5.1 R; 81/418; 81/424; 81/426

[58] Field of Search ............... 29/268; 81/425 R, 426, 81/418, 424, 5.1 R

[56] References Cited

U.S. PATENT DOCUMENTS

| | | | |
|---|---|---|---|
| 955,386 | 4/1910 | Crossman | 81/5.1 R |
| 974,368 | 11/1910 | Eaton | 29/268 |
| 1,427,550 | 8/1922 | Ridings | 81/424 X |
| 1,746,016 | 2/1930 | Shiffman et al. | 29/268 X |
| 2,036,550 | 4/1936 | Stevens | 29/268 |
| 2,190,478 | 2/1940 | Kleinknecht | 81/5.1 R |
| 2,314,884 | 3/1943 | Klein | 81/5.1 R |
| 2,318,270 | 5/1943 | Wagoner | 29/268 UX |
| 2,439,501 | 4/1948 | Yelkin | 81/5.1 R |
| 2,779,224 | 1/1957 | Coggburn | 81/424 X |
| 3,519,188 | 7/1970 | Erhardt | 81/5.1 R |

FOREIGN PATENT DOCUMENTS

| | | | |
|---|---|---|---|
| 44,551 | 10/1910 | Germany | 81/5.1 R |
| 316,876 | 12/1956 | Switzerland | 81/424 |

*Primary Examiner*—James L. Jones, Jr.
*Assistant Examiner*—J. T. Zatarga
*Attorney, Agent, or Firm*—Mahoney, Schick & Cislo

[57] ABSTRACT

A crimping tool, for crimping eyelets or deforming hollow, male rivet fasteners, having a plier-like configuration. Opposed jaws with handles and linkage for movement of the jaws towards and away from each other is provided whereby a metal fastener is deformed into a fastening position. One of the jaws, in one embodiment, carries a platen surface against which one end of the fastener abuts while the opposed jaw carries a pin forming member which is received in the hollow tubular portion of the fastener and which is subsequently deformed or cold formed to form a locking, retaining collar or flange. In another embodiment, the crimping tool is provided with a dual pin forming jaw and a dual eyelet or fastener may be acted upon in a single operation of the crimping tool.

12 Claims, 9 Drawing Figures

Fig. 1.
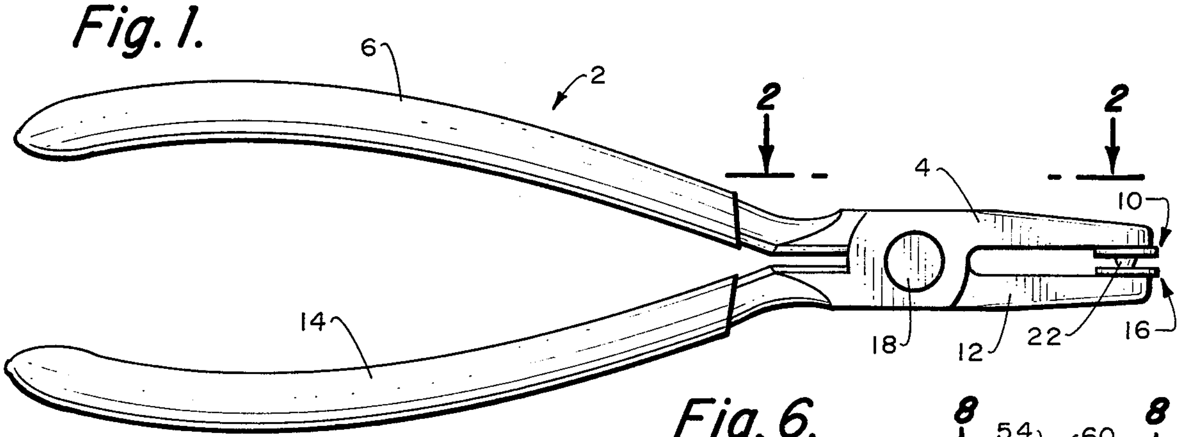
Fig. 2.
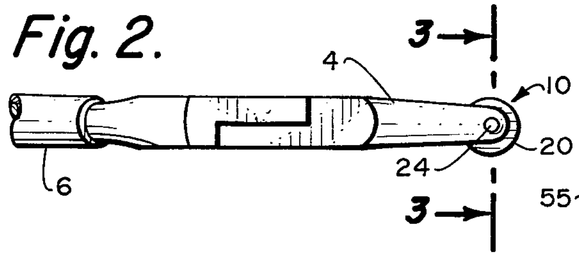
Fig. 6.
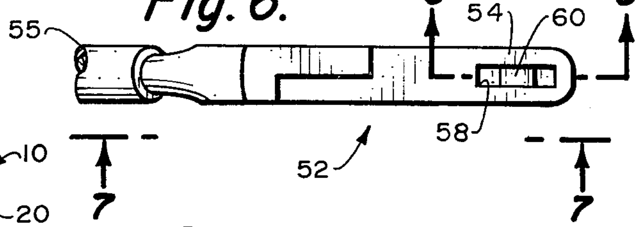
Fig. 7.
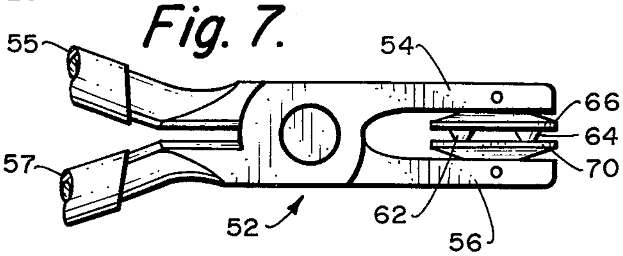
Fig. 3.
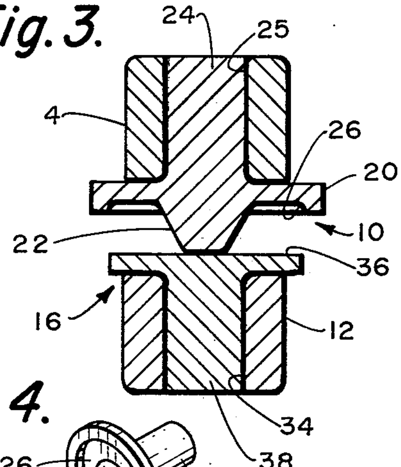
Fig. 8.
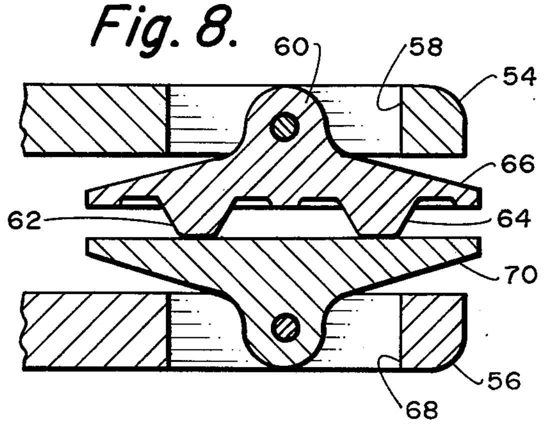
Fig. 4.
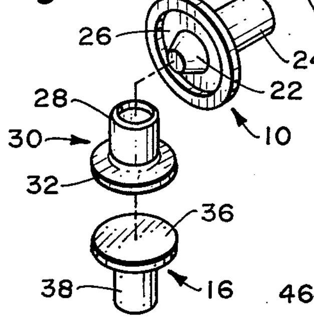
Fig. 9.
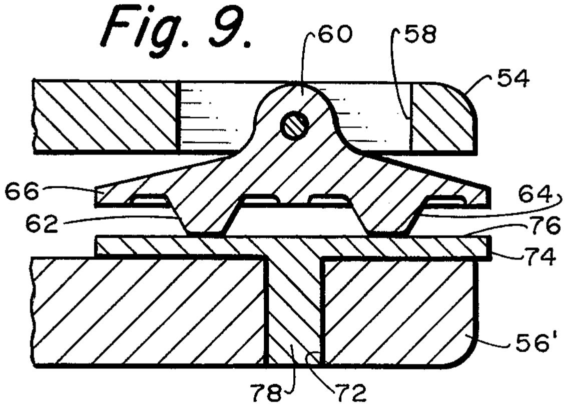
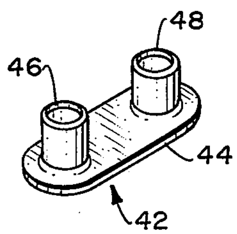
Fig. 5.

CRIMPING TOOL

BACKGROUND OF THE INVENTION

In the fastening art, hollow, metal male rivet fasteners or eyelets are utilized for fastening purposes. For example, when utilized in an identification device of the bracelet type, as disclosed and claimed in Charles, et al. co-pending patent application Ser. No. 702,483, filed July 6, 1976, and entitled TAMPER-RESISTANT IDENTIFICATION DEVICE, a tool is utilized to deform a fastener member into the fastening position.

The eyelet or hollow male rivet fastener has an annular, integral head and a centrally located upstanding hollow stem where the hollow stem is deformed or rolled in order to form a fastening flange to cooperate with the annular integral head of a single or double fastening member. Heretofore, various tools have been utilized in order to effect fastening but with the herein disclosed device, a simple means of effecting fastening is obtained.

The device of the invention comprises a pair of opposed jaws with handles and linkage for movement of the jaws toward and away from each other wherein one of the jaws has an anvil means carried on the terminus thereof and the other of the jaws has a forming means on the terminus thereof, whereby through cooperation of the anvil means and the forming means, the fastener is deformed or placed in the fastening configuration. The forming means, having a recessed surface circumventing the forming pin portion, allows for the deformation of the hollow stem of the fastener into a collar or flange without damage to the adjacent material of the objects to be fastened.

The tool of the herein disclosed invention negates the utilization of separate hand tools or other means of obtaining fastener securement in an easy and facile manner.

OBJECTS AND SUMMARY OF THE INVENTION

It is an object of the invention to provide a crimping tool for metal fasteners.

It is another object of the invention to provide a fastener deforming tool for eyelet or hollow male rivet fasteners.

It is another object of the invention to provide a tool for cold forming hollow male rivet fasteners.

It is still another more important and specific object to provide a crimping tool for utilization in deformable metal fasteners wherein the metal fastener employs a head portion and an upstanding hollow male tubular portion for securing purposes in a simple and easy procedure.

It is still another more specific object of the invention to provide a pliers-like metal fastener deforming tool which is easy to use and which is essentially trouble free in operation.

It is another still important more specific object of the invention to provide a fastener crimping tool for utilization with dual fasteners wherein in a single operation a dual fastening operation is performed.

In an exemplary embodiment, the invention pertains to a hollow, male rivet fastener crimping tool comprising a pair of opposed jaws with handles and linkage for movement of the jaws toward and away from each other wherein one of said jaws has an anvil means carried on the terminus thereof and the other of said jaws has a forming means on the terminus thereof, said anvil means and said forming means being adapted for cooperative cold forming at least one hollow male rivet fastener, said forming means having at least an upraised central portion to be received within an extremity of said hollow male rivet fastener, whereby movement thereof toward said anvil means causes said extremity to be cold formed into an annular retaining collar.

These and other objects of the invention will become apparent from reference to the figures of drawing and the hereinafter following commentary.

BRIEF DESCRIPTION OF THE DRAWING

FIG. 1 is a side view of one embodiment of the crimping tool of this invention;

FIG. 2 is a view taken along the line 2—2 of FIG. 1;

FIG. 3 is a view taken along the line 3—3 of FIG. 2;

FIG. 4 is an exploded view showing the manner of operation of the working components of the tool invention in conjunction with a single fastener;

FIG. 5 is a perspective view of a dual fastener with which another of the embodiments of the invention is used;

FIG. 6 is a partial view in plan of an alternate embodiment of the crimping tool of this invention;

FIG. 7 is a view taken along the line 7—7 of FIG. 6;

FIG. 8 is a view taken along the line 8—8 of FIG. 6; and

FIG. 9 is a view similar to FIG. 8 but illustrating still another embodiment of the crimping tool of this invention.

DESCRIPTION OF THE BEST EMBODIMENTS CONTEMPLATED

Referring to the drawings wherein like numerals of reference designate like elements throughout, and referring specifically to FIGS. 1, 2 and 3, the crimping tool 2 is illustrated as being plier-like in configuration employing jaw 4 with integral handle 6 wherein the jaw 4 has positioned on the terminus thereof a forming pin means 10 linked to opposing jaw 12 having integral handle 14 and having an anvil means 16 on the terminus thereof, each of the jaws 4 and 12 being connected through linkage 18 for movement of the jaws 4 and 12 towards and away from each other.

The linkage 18 as well as the specific configuration of handles 6 and 14 and jaws 4 and 12 is similar to that found in a conventional pliers as best illustrated in FIG. 2.

The crimping tool 2 has a forming pin means 10 comprising an annular head portion 20 with a central protuberance 22 having a tapered shoulder or truncated conical configuration in cross-section as illustrated in FIG. 3, with extending shank 24. The jaw 24 is provided with a through bore 25 which receives the shank 24 of forming pin means 10 in rigid secure relationship. The pin forming means 10 has a central recessed portion 26 circumscribing the upstanding protuberance portion 22, the size of which is adapted to be received into the hollow portion 28 of fastener 30 which hollow portion 28 is integral with the head 32 of hollow male rivet fastener 30.

The opposed jaw 12 is also provided with a bore 34 so as to receive annular anvil means 16 having a platen surface 36 and an integral shank portion 38 as illustrated in FIG. 3.

In the FIG. 1–4 device of the invention, the metal fastener 30 is positioned in an appropriate aperture of, for example, a band of material wherein it is desirable to fasten one end of the band to the other in an encircling configuration. The end of the band of material opposite to that end carrying the metal fastener 30 is also provided with an aperture of a size to receive the hollow male portion 28 of fastener 30 whereupon the tool 2 is positioned as schematically illustrated in FIG. 4 and the jaws 4 and 12 brought towards one another thereby moving the pin forming element 22 into the opening or hollow of element 28 of fastener 30 which, in turn, brings the head 32 of fastener 30 into abutting relationship to the platen surface 36 of anvil means 16. Continued movement of the jaws 4 and 12 towards one another with the metal fastener therebetween forces the extremity of tubular portion 28 of metal fastener 30 to flare out and roll in a cold forming manner about itself to form a locking or retaining flange for the two ends sought to be fastened together.

Referring now to FIG. 5, there is illustrated a dual type of metal fastener 42 in this instance having an elongated bottom plate 44 and having two upstanding hollow tube portions 46 and 48 to act as a fastener for, for example, a strip or band of material having two aligned holes with the opposed end also having aligned holes for securement of one end to the other. In order to perform the fastening function in one step, the alternate embodiment of the tool of the invention may be utilized as is illustrated in FIGS. 6–9 inclusive.

Referring to FIGS. 6–9 inclusive, it will be noted that the tool 52 has the same type of linkage for jaw members 54 and 56 each having handle portions 55 and 57 respectively, only partially shown, wherein the tool 52 is modified with respect to the tool 2 previously illustrated and described in the forming portions thereof.

The tool 52 and specifically the jaw 54 is provided with a slot 58 in which is pivotally disposed forming pin member 60 having forming pin protuberances 62 and 64 centrally spaced on annular portion 66 and being of a size to cooperate with the hollow metal upstanding portions 46 and 48 of metal fastener 42 and wherein the jaw 56 is provided with slot 68 to receive anvil means 70 in pivotal relationship so as to coact with forming pin means 60 to effect the fastening function as previously described with respect to the crimping tool 2. The pivotal nature of the forming pin means 60 and anvil means 70 permits proper location of the tool 52 with regard to the fastener 42 and any elements which are to be fastened together.

Referring to FIG. 9 another embodiment of the invention is illustrated wherein the jaw 54 is identical to that described with regard to FIG. 8 but wherein the jaw 56' is provided with a bore 72 which receives anvil member 74 having a planar platen 76 and shank 78 received in the bore 72 in a manner previously described with regard to crimping tool 2. In this particular instance, operation of the tool is identical to that embodiment illustrated in FIGS. 6–8 inclusive which as described is essentially identical in overall function to the tool 2 with the exception that the platen or anvil means 74 is stationary as opposed to pivotally disposed or carried by the jaw 56'.

In each embodiment of the invention, unique fastening is obtained by reason of the forming pin portion of the tool being provided with a central protuberance having a surrounding recessed portion terminating in an upraised peripheral edge or bead that permits the hollow, male stem of the fastener to be cold formed into a flange or collar having substantially smooth edges to prevent damage of material between the flange and collar and head of the hollow, male fastener, once the fastener has been formed into the fastening position.

Thus, there has been disclosed an eyelet or hollow, male rivet fastener crimping tool which is easy to use and which obtains a fastening function in an easy and facile manner.

While the description and figures of drawing are specific as to the details of construction of the crimping tool of this invention, there are modification and changes which will suggest themselves, one such modification being that one of the handles, for example, 6 and 14 of tool 2 may be of a different color than the other of the handle to indicate the jaw which carries one or the other of the forming elements of the tool and additionally the handles 6 and 14 may be provided with a plastic coating or layer in order to make their use less rigorous on the human hand employing such tool and all such other changes and modifications that will suggest themselves to those of skill in the art will not depart from the spirit and scope of the invention and are intended to be included in the appended claims.

I claim:

1. A hand-held, eyelet crimping tool comprising a pair of opposed jaws with handles and linkage for movement of the jaws toward and away from each other, one of said jaws having an annular anvil platen portion on the terminus thereof, the other of said jaws having a forming pin portion on the terminus thereof, said annular anvil platen portion being adapted for abutting relationship to said forming pin portion when said jaws are in the crimping position, said pin portion being centrally located and adapted to be superposed centrally of said annular anvil platen portion when said jaws are moved toward each other, said forming pin portion having an annular plate at least the diameter of said annular anvil platen portion and having a centrally located upstanding pin relative to said annular plate, the surface of said annular plate circumferentially of said upstanding pin being recessed relative to the circumferential edge of said plate to form an upraised circumferential lip about said edge.

2. The tool in accordance with claim 1 wherein said upstanding pin has a tapered shoulder and is of a size adapted to be received within an eyelet opening.

3. The tool in accordance with claim 2 wherein each of said portions are integrally formed and have an extending shank portion for secure reception in opposed bores in each of said opposed jaws.

4. The tool in accordance with claim 3 wherein said bores are annular and said shanks of said portions are rigidly secured in said annular bores.

5. The tool in accordance with claim 4 wherein said upstanding pin, in cross section, forms a truncated conical section.

6. The tool in accordance with claim 5 wherein one of said handles is color coded to visually indicate which handle carries said forming pin portion.

7. A hollow male rivet fastener crimping tool capable of being hand-held and comprising a pair of opposed jaws with handles and linkage for movement of the jaws toward and away from each other, one of said jaws having annular anvil means carried on the terminus thereof, the other of said jaws having forming means on the terminus thereof, said anvil means and said forming means being adapted for abutting relationship when said jaws are in the crimping position and for cooperative cold forming at least one hollow male rivet fastener, said forming means having an annular plate at least the diameter of said annular anvil means and having at least an upraised central portion relative to the remainder thereof, to be received within an extremity of said hollow, male rivet fastener whereby movement thereof towards said annular anvil means causes said extremity to be cold formed into an annular retaining collar, said upraised central portion being truncated and conically shaped in configuration, the surface of said annular plate circumferentially of said upraised central portion being recessed relative to the circumferential edge of said plate to form an upraised circumferential lip about said edge.

8. The tool in accordance with claim 7 wherein said forming pin member is pivotally secured to said one of said jaws.

9. The tool in accordance with claim 8 wherein said annular anvil member is pivotally secured to the other of said jaws.

10. The tool in accordance with claim 9 wherein said forming means has at least two, spaced upraised portions for deforming cooperation with said annular anvil member.

11. The tool in accordance with claim 8 wherein said annular anvil member is rigidly secured to the other of said jaws.

12. The tool in accordance with claim 7 wherein one of said handles is color coded to visually identify one of the other of said jaws.

* * * * *